3,079,447
ISOMERIZATION OF AROMATICS IN THE PRESENCE OF AN ALUMINA-PLATINUM-BORIA CATALYST
Ronald S. Bartlett, Thornton, Glenn O. Michaels, Park Forest, and Owen H. Thomas, Dolton, Ill., assignors, by mesne assignments, to Sinclair Research, Inc., New York, N.Y., a corporation of Delaware
No Drawing. Filed June 13, 1960, Ser. No. 35,423
6 Claims. (Cl. 260—668)

This invention relates to a process for the isomerization of alkyl aromatics.

Alkyl aromatic isomerization reactions can usually be divided into at least two distinct types. One type involves the migration of an alkyl group around the aromatic ring as in the conversion of isodurene to durene. This type of reaction presumably does not involve rupture of the bonds within the ring and it usually proceeds rapidly without too much difficulty. Another type of isomerization involves the conversion of ethyl, propyl and higher alkyl groups on the ring into methyl-substituted aromatics or into aromatics having side chains with fewer carbon atoms. This type of reaction presumably involves a ring expansion-contraction mechanism and is usually much slower than the migration of alkyl groups around the ring. In particular, as the number of carbon atoms in the side chain increases, there is a greater tendency for the alkyl groups to split off (dealkylate) from the aromatic ring forming lower molecular weight aromatics and cracked products. Thus, isomerizations of this latter type generally demonstrate a relatively poor selectivity to the methyl-substituted aromatics of the same molecular weight as the alkyl aromatic isomerized.

We have now discovered a two-stage process for increasing the selectivity of the isomerization reaction of certain alkyl aromatics to methyl-substituted aromatics. According to the present invention a benzene aromatic hydrocarbon in the $C_8$ to $C_{12}$ range preferably in the $C_9$ to $C_{10}$ range, having one or more alkyl groups of 2 or more carbon atoms, preferably 3 or more carbon atoms, in length, attached to the aromatic ring is first contacted under vapor phase isomerization conditions and in the presence of free hydrogen with a catalyst consisting essentially of alumina and catalytic amounts of boria and a platinum group metal. In the second stage of the present invention, isomerized product from the first stage is dehydrogenated in the presence of a dehydrogenation catalyst under dehydrogenation conditions to obtain a product which is mostly or even substantially entirely aromatic.

The isomerization reaction conditions of the first step in the present invention include a temperature sufficient to maintain the alkyl aromatic feed in the vapor phase under the pressure employed. Generally this temperature will be from about 500 to 740 or 750° F., preferably about 550 to 650° F., while the pressure will be superatmospheric, for instance, ranging from about 50 to 2000 p.s.i.g., preferably about 300 to 600 p.s.i.g. The catalyst can be used as a fixed, moving or fluidized bed or in any other convenient type of handling system. The fixed bed system seems most advantageous at this time and the weight hourly space velocity will in most cases be from about 0.25 to 50, preferably about 1 to 10. Free molecular hydrogen must be present in our reaction system and the hydrogen to alkyl aromatic molar ratio will usually be from about 1 to 20:1 or more, preferably about 4 to 12:1. In this stage of the present invention, generally about 10 or 25 to 100% by weight of naphthenes, preferably about 50 to 95% by weight, are in the reaction product. In the second stage of the invention the isomerized naphthenes are dehydrogenated to aromatics.

Our hydrocarbon conversion catalyst for the first stage includes catalytically effective amounts of a noble or platinum group metal and boria supported on an alumina base. The catalyst generally contains about 0.05 to 2 weight percent, preferably 0.1 to 1 weight percent, of one or more of the platinum metals of group VIII e.g. platinum, palladium, rhodium, ruthenium, osmium or iridium, with the metals having face centered cubes being preferred. The small amount of noble metal may be present in the metallic form or as a sulfide, oxide or other combined form. The metal may interact with other constituents of the catalyst, but if during use the noble metal be present in metallic form then it is preferred that it be so finely divided that it is not detectable by X-ray diffraction means, i.e. that it exists as crystals of less than about 50 Angstrom units size. Of the noble metals platinum, palladium and rhodium are used most advantageously.

The boria component is surface dispersible on the support. It is employed in amounts sufficient to enhance the acidity of the alumina support and such amounts are, therefore, preferably added in direct proportion to the area of the support. For instance, the amount of boria will usually be about 0.5 to 20 weight percent, and preferably about 5 to 15 weight percent, of the catalyst. These amounts are particularly effective on aluminas having surface areas of about 350 to 600 square meters per gram (BET) before use.

The noble metal and boria constituents of the catalyst are deposited on an absorptive alumina base of the activated or calcined type. The base is usually the major component of the catalyst, generally constituting at least about 75 weight percent on the basis of the catalyst, preferably at least about 80 to 90%. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates, bayerite I, bayerite II (randomite or nordstrandite) or gibbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillontrite, halloysite, etc.), titania, zirconia, etc., or their mixtures. Although the components of the catalyst can vary as stated, a preferred catalyst contains platinum and boria deposited on activated alumina at least about 200 square meters per gram surface area before use.

As previously stated the preferred catalyst base material is an activated or gamma-alumina made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite or nordstrandite) as defined by X-ray diffraction analysis. The substantial balance of the hydrate is amorphous hydrous or monohydrate alumina. Trihydrates are present as well defined crystallites; that is, they are crystalline in form when examined by X-ray diffraction means.

The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in the patent the calcined catalyst base can be characterized by large surface area ranging from about 350 to about 550 or more square meters/gram when in the virgin state as determined, for example, by the BET absorption technique. A low area catalyst base prepared by treating the predominantly trihydrate base precursor is described in U.S. Patent No. 2,838,445. This base when in the virgin state has substantially no pores of radius less than about 10 Angstrom units and the surface area of the catalyst base is less than about 350 square meters/gram and most advantageously is in the range of about 150 to 300 square meters/gram.

The platinum group metal component of the catalyst can be added to the alumina base by known procedures. For instance, the platinum metal component can be deposited on a calcined or activated alumina, but it is preferred to add the platinum metal component to the alumina hydrate precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma-alumina modifications. The boria can be added to the catalyst in any stage of its preparation. It may be incorporated in the support, for instance, by precipitation, coprecipitation, impregnation, and mulling either before or after the addition of the group VIII metal. It can also be applied by impregnation from solution (water, organic or inorganic solvents) or from a gas phase. However, it is frequently added to the catalyst after it has been formed by tableting or extrusion and calcined. After the boria is added in this procedure the catalyst can be recalcined. Preferably, the boria is added by pouring a hot solution of boric acid over the platinum alumina catalyst, stirring thoroughly, and then drying and calcining.

The catalyst of the present invention can be easily regenerated employing conventional procedures, for instance, by subjecting it to an oxygen-containing gas at temperatures sufficient to burn off carbon deposited on the catalyst during the conversion of petroleum hydrocarbon feedstock. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The dehydrogenation conditions of the second stage of the present invention generally employed will fall within the following ranges: temperature, about 600 to 1000° F., preferably about 700 to 900° F.; pressure, atmospheric to about 600 p.s.i.g., preferably atmospheric to about 200 p.s.i.g.; weight hourly space velocity, about 0.25 to 20, preferably about 1 to 10; free hydrogen to hydrocarbon mole ratio, about 1 to 20:1, preferably about 6 to 12:1. Examples of suitable catalyst ingredients employed in the dehydrogenation stage are any of the dehydrogenation catalysts such as molybdenum, tungsten, vanadium, tin, chromium, the group VIII metals, for instance, iron, cobalt, nickel, platinum group metals and their oxides, sulfides and other combined forms. Mixtures of these materials or compounds or two or more of the oxides can be employed. Minor catalytic amounts, usually less than about 10% or 20% and at least about 0.1% of these ingredients can be dispersed on or carried as promoters by solid materials such as charcoal, oxides, silicates or mixtures or oxides and silicates. Since a dehydrogenation catalyst which causes little, if any, dealkylation is preferred, the carrier material or support is preferably essentially non-acidic. The more acidic the support is, the less severe should be the dehydrogenation conditions so as to avoid dealkylation. The composite is usually calcined or activated after the promoting metal is added. Specific examples of suitable dehydrogenation catalysts are platinum or alumina, platinum-on-charcoal, cobalt-molybdena-on-alumina, nickel-tungsten oxide-on-alumina, nickel-tungsten sulfide-on-alumina, cobalt-molybdena-on-silica-alumina and palladium-on-charcoal.

The alkyl aromatic feed material employed in our process is a material that contains as the major fraction a $C_8$ to $C_{12}$ benzene aromatic hydrocarbon having attached to its aromatic ring one or more alkyl groups of at least 2 carbon atoms, preferably of at least 3 carbon atoms. The preferred alkyl aromatic feeds are those containing as a major fraction $C_9$ and $C_{10}$ benzene derivatives in which at least one side chain is longer than two carbon atoms.

The following specific examples will serve to illustrate our invention but are not to be considered limiting.

EXAMPLE I 300 grams of a calcined platinum-alumina catalyst of the type described in U.S. Patent No. 2,838,444 were weighed into a 6" crystallizing dish. The catalyst analyzed 0.6% platinum and at the time of platinum addition and before calcination the alumina comprised about 70% trihydrate (42% bayerite, 18% randomite, 11% gibbsite) with the remaining being substantially of the amorphous of monohydrate forms. After calcination at a maximum temperature of about 925° F. the catalyst composition had an area (BET method) within the range from about 350 to 550 square meters per gram. 59 grams of $H_3BO_3$ were dissolved in 279 ml. of deionized water by heating to boiling. The hot boric acid solution was poured over the platinum-alumina catalyst and stirred thoroughly with a rubber spatula. The catalyst was placed in a forced air drying oven, set at 284° F. for 4 hours. The catalyst was stirred occasionally while drying. The oven-dried catalyst was transferred to a sagger and placed in a muffle furnace preheated to 1000° F. The catalyst was held at 1000° F. for 2 hours and cooled in a desiccator. Analysis 9.95% $B_2O_3$.

EXAMPLE II

A 1" Universal Stainless Steel reactor is charged with 88 g. (100 cc.) of a platinum-alumina-boria catalyst prepared essentially as above. Hydrogen flow is maintained at a rate of 0.5 to 1.0 cubic foot per hour for 3 hours to insure platinum reduction. At this time feedstock composed of 1 mole of cumene/1 mole of diethylbenzene is passed over the catalyst from a pump and the reaction is conducted under the conditions shown in Table I. At the end of a three hour reaction period the run is terminated and the products removed to a dehydrogenation zone and contacted with a platinum-on-carbon catalyst at a temperature of 900° F., pressure of 200 p.s.i.g., WHSV of 10 and a hydrogen to hydrocarbon ratio of 4/1. The products from the dehydrogenation reaction are analyzed by mass spectrograph and infrared. The results are shown in Table I. For comparative purposes runs of a one stage isomerization process employing the same platinum-boria-alumina catalyst are shown. The reaction conditions employed in the runs are also shown in Table I.

Table I
ISOMERIZATION OF 1/1 CUMENE/DIETHYLBENZENE MOLE RATIO

[Isomerization Catalyst: 0.6% Pt–10% $B_2O_3$–$Al_2O_3$. Feed: 1 mole of cumene/1 mole of Diethylbenzene]

|  | One stage | One stage | Two stage [1] |
|---|---|---|---|
| Isomerization conditions: | | | |
| Temperature, °F | 800 | 800 | 700 |
| Pressure, p.s.i.g. | 500 | 500 | 500 |
| WHSV | 17.5 | 8.4 | [3] 3.5 |
| $H_2$/HC | 4.3/1 | 15/1 | 20/1 |
| Weight percent naphthenes at equil. | ~1 | ~1 | ~17.5 |

|  | Feed | | | |
|---|---|---|---|---|
| Overall recovery, weight percent: | | | | |
| $C_9$ aromatics, weight percent | 47.5 | 12 | 11 | [2] 21 |
| $C_{10}$ aromatics, weight percent | 52.5 | 49 | 41 | [2] 37 |
| Conversion of cumene, weight percent | | 85.6 | 91.6 | 90.6 |
| Conversion of diethbenzene, weight percent | | 19.5 | 37.7 | 53.4 |
| Selectivity of the conversion of cumene to trimethyl benzenes, weight percent | | 8.2 | 9.1 | 36.9 |
| Selectivity of the conversion of dietbenzene to ethylxylenes, weight percent | | 16.9 | 9.3 | 23.4 |
| Selectivity of the conversion of dietbenzene to tetramethylbenzene, weight percent | | 37 | 24.6 | 20.6 |

[1] Dehydrogenation catalyst: 0.6% Pt on carbon; 900° F., 200 p.s.i.g., 10 WHSV, ~4/1 $H_2$/HC.
[2] Overall recovery from both the isomerization step and the dehydrogenation step.
[3] First stage.

quite as marked. At 20% conversion of diethylbenzene, the selectivity to ethyl xylene plus tetramethyl benzenes was 64% in the one-stage process. At 38% conversion, selectivity dropped to 34% when operating in one stage. In the two-stage process of the present invention, the selectivity was 44% at greater than 50% conversion.

The data indicate that selectivity of the isomerization of diethylbenzene decreases rapidly as the conversion increases. It is apparent that the optimum conditions for the conversion of diethylbenzene are more severe than are required for the conversion of cumene, so higher overall selectivities can be obtained if the two types of compounds are isomerized in separate reaction zones.

EXAMPLE III

Pure grade cumene was isomerized in accordance with the two-stage process of the present invention and also by a one-stage process. The isomerization catalyst in both instances was 0.6% Pt, 10% $B_2O_3$ on $Al_2O_3$. The dehydrogenation catalyst employed in the second step of the two-stage process was 0.6% Pt–$Al_2O_3$. The reaction conditions and results are given in Table II. A comparison of the one-step and two-step processes as to selectivity is given in Table III.

Table II
ISOMERIZATION OF CUMENE

| | 993–52 | 993–54 | 993–55 | 993–56 | 993–57 | 993–58 |
|---|---|---|---|---|---|---|
| Run number | | | | | | |
| Catalyst | Pt-$B_2O_3$-$Al_2O_3$ | Pt-$Al_2O_3$ | Pt-$Al_2O_3$ | Pt-$B_2O_3$-$Al_2O_3$ | Pt-$B_2O_3$-$Al_2O_3$ | Pt-$Al_2O_3$ |
| Feedstock | P.G. cumene | Prod. from 993–52 | Prod. from 993–52 | P.G. cumene | P.G. cumene | Prod. from 993–57 |
| Isomerization conditions: | | | | | | |
| Temperature, °F | 600 | 900 | 800 | 600 | 600 | 900 |
| Pressure, p.s.i.g. | 500 | 200 | 200 | 50 | 500 | 200 |
| WHSV | 4.4 | 8.0 | 8.4 | 1.4 | 1.9 | 5.7 |
| $H_2$/HC | ~10/1 | ~5/1 | ~5/1 | ~5/1 | ~5/1 | ~6/1 |
| Percent nap. at equil | ~90% | ~0 | ~0 | ~2% | ~90% | ~0 |
| Recovery, weight percent: | | | | | | |
| Liq. prod. | 100.4 | 89.4 | 89.4 | 73.3 | 92.0 | 90 |
| Dry gas | 6.9(3.1) | 6.4 | 7.5 | 30.8(25.2) | 12.0(10.6) | 14 |
| $H_2$ | −7.3 | 4.2 | 3.1 | −4.1 | −4.0 | 4 |
| VPC analysis of total liquid product: | | | | | | |
| $C_8$ | (1) | 15.6 | 32.4 | 38.1 | (1) | 26.7 |
| Cumene | (1) | 38.7 | 35.9 | 18.5 | (1) | 5.9 |
| Ethyltoluenes | (1) | 18.8 } 83.6 | 12.5 } 66.6 | 17.1 } 61.4 | (1) | 19.0 } 72.9 |
| Trimethylbenzenes | (1) | 26.1 | 18.2 | 25.8 | (1) | 48.0 |
| Other | (1) | 0.9 | 1.1 | 0.5 | (1) | 0.4 |
| | Equilibrium distribution | | | | | |
| VPC analysis of normalized $C_9$ fraction: | | | | | | |
| Cumene | 2 | 46.3 | 54.9 | 30.2 | | 8.1 |
| Ethyltoluene | 24 | 22.4 | 18.8 | 27.8 | | 26.1 |
| Trimethylbenzenes | 74 | 31.2 | 27.3 | 42.0 | | 65.8 |

[1] Naphthenes.

The data demonstrates the advantage of using the two-stage process of the present invention over a one-stage isomerization process for the conversion of cumene. At 85–92% conversion of cumene, the selectivity to trimethylbenzenes is only 8–9% in the one-stage process whereas the selectivity to trimethylbenzenes in the two-stage process of the present invention is about 4 times as great at the same conversion level.

There is also significant advantage in using the two-stage process of the present invention for the isomerization of diethyl substituted aromatics but the difference is not

Table III
COMPARISON OF ONE-STEP VERSUS TWO-STEP PROCESS IN THE ISOMERIZATION OF CUMENE

| | One-step process, percent, Run #56 | Two-step process, percent | |
|---|---|---|---|
| | | Run #54 | Run #53 |
| Conversion of cumene | 86.5 | 65.2 | 95.1 |
| Selectivity to benzene | 16.8 | 6.8 | 6.4 |
| Selectivity to ethyl toluene | 14.4 | 26 | 16.6 |
| Selectivity to trimethyl benzenes | 22 | 36 | 42 |

Examination of Table III shows that in the two-stage process, the conversion of cumene to benzene was only 6-7% even at the 95% conversion level. In the one-stage process, the degradation of cumene to benzene was over twice as high at 87% conversion. Furthermore, the selectivity to trimethyl benzenes was almost twice as great in the two-stage process as in the one-stage operation. An examination of the $C_9$ fraction in the product from Run No. 993-58 shows that near equilibrium distribution of the $C_9$ aromatics was formed.

| Compound | Equilibrium distribution at 620° F.[1] | VPC analysis of $C_9$ product Run No. 993-58 |
| --- | --- | --- |
| Cumene | 2 | 8 |
| Ethyl toluene | 24 | 26 |
| Trimethylbenzenes | 74 | 66 |

[1] Chemical Thermodynamics Properties of Hydrocarbons, Frederick D. Rossini, American Petroleum Institute Research Project No. 44.

We claim:
1. A two-stage process for isomerizing $C_8$ to $C_{12}$ alkyl benzene hydrocarbons having at least one alkyl group containing at least 2 carbon atoms which is converted to a methyl-substituent which comprises contacting said alkyl benzene hydrocarbon under vapor phase isomerization conditions at a temperature of about 500 to 750° F. and in the presence of free hydrogen with a catalyst consisting essentially of alumina and catalytic amounts of boria and a platinum group metal, to convert at least about 10% of the alkyl benzene feed to naphthene hydrocarbon and then dehydrogenating resulting isomerized product in the presence of a dehydrogenation catalyst under dehydrogenation conditions including a temperature of about 600 to 1000° F.

2. The method of claim 1 in which the alkyl benzene feed has 9 to 10 carbon atoms.

3. The process of claim 2 wherein the alkyl group contains 3 carbon atoms.

4. The process of claim 3 wherein the catalyst consists essentially of alumina, about 0.1 to 1 weight percent of a platinum group metal and about 5 to 15 weight percent boria.

5. The process of claim 4 wherein the platinum group metal is platinum.

6. The process of claim 5 wherein the alumina is derived by calcination of hydrous alumina containing about 65 to 95 percent trihydrate and has a surface area of about 350 to 550 square meters per gram before use.

References Cited in the file of this patent
UNITED STATES PATENTS

| | | |
| --- | --- | --- |
| 2,403,757 | Reeves | July 9, 1946 |
| 2,751,333 | Heinemann | June 19, 1956 |

OTHER REFERENCES

Pitts et al.: "Industrial and Engineering Chemistry," vol. 47, pages 770-773, April 1955.